United States Patent

[11] 3,540,781

| [72] | Inventors | Atutosi Okamoto<br>Toyohashi-shi;<br>Koichi Taniguchi, Kariya-shi; and Yoshiaki<br>Nakano, Gifu-shi, Japan |
|---|---|---|
| [21] | Appl. No. | 753,953 |
| [22] | Filed | Aug. 20, 1968<br>Continuation-in-part of application<br>Ser. No. 685,118, Nov. 22, 1967, now<br>Pat. No. 3,467,443 |
| [45] | Patented | Nov. 17, 1970 |
| [73] | Assignee | Nippon Denso Company Limited<br>Kariya-shi, Japan<br>a corporation of Japan |
| [32] | Priority | Dec. 16, 1967 |
| [33] | | Japan |
| [31] | | 42/80,825 |

[54] ANTISKID APPARATUS FOR AUTOMOTIVE VEHICLES
2 Claims, 4 Drawing Figs.

[52] U.S. Cl. ...................................................... 303/21,
188/181
[51] Int. Cl. ...................................................... B60t 8/08,
B60t 8/14

[50] Field of Search ............................................ 303/21 all,
6; 188/181

[56] References Cited
UNITED STATES PATENTS

| 2,788,186 | 4/1957 | Wilson ......................... | 303/21X |
| 2,869,687 | 1/1959 | Keim et al ..................... | 303/21X |
| 3,245,213 | 4/1966 | Thompson et al. ........... | 303/21 |
| 3,275,384 | 9/1966 | Hirzel ........................... | 303/21 |
| 3,362,757 | 1/1968 | Marcheron ................... | 303/21 |

Primary Examiner—Milton Buchler
Assistant Examiner—John J. McLaughlin
Attorney—Cushman, Darby & Cushman ABSTRACT: An antiskid apparatus for an automotive vehicle, which is capable of avoiding a loss of steerability of the steering wheel during the braking operation due to unbalance between the braking forces applied to the front and rear wheels and thereby enables the body of the automotive vehicle to be braked in a stable manner, said apparatus comprising at least one speed generator provided on the front and rear wheels of the automotive vehicle respectively for detecting the speeds of the respective wheels and means for controlling the braking force by the output voltage of the speed generator which is mounted on that one of the front and rear wheels which is closest to the locked state.

3,540,781

ANTISKID APPARATUS FOR AUTOMOTIVE VEHICLES

CROSS REFERENCE TO THE RELATED APPLICATION

This is a continuation-in-part of application of our U. S. Pat. Ser. No. 685,118 filed on Nov. 22, 1967, now U. S. Pat. No. 3,467,443.

BACKGROUND OF THE INVENTION

1. Field of the Invention

The present invention relates to an antiskid apparatus and more particularly to an antiskid apparatus for an automotive vehicle by which a loss of steerability of the vehicle or a gyrating movement of the vehicle body due to the locking of a wheel by a braking force applied thereon during the run of the automotive vehicle on a slippery road surface or at a high speed can be avoided.

2. Description of the Prior Art

In a conventional antiskid apparatus, a braking force has been controlled by a signal from a wheel speed detector or wheel acceleration-deceleration detector which is operatively connected mainly with the rear wheels or more practically with the outlet terminal of a cable from a speedometer mounted on the transmission.

However, with such an antiskid apparatus, since the signal obtained from the rear wheels for controlling the braking force is a representative of the speed changes of all the wheels, there is a tendency that in case, for instance, of quick braking, the front wheels subjected to a greater proportion of the braking force are locked while the rear wheels which are subjected to a smaller proportion of the braking force are not locked, and hence the primary object of the antiskid apparatus, that is, to maintain the steerability of the vehicle during braking operation, cannot be attained. Now, since the proportions of the braking force distributed to the respective wheels are variable depending upon the manner in which the drive of the vehicle is braked, the braking system is so designed that the braking force applied to the rear wheels will be smaller in a braking force by the than that applied to the front wheels, in the case of quick braking, for the purpose of preventing a gyrating movement of the vehicle body. Therefore, with the conventional antiskid apparatus, it is inevitable for the front wheels to be locked during quick braking and thus the intended functioning of the antiskid apparatus cannot be fully obtained.

SUMMARY OF THE INVENTION

It is an object of the present invention to provide an antiskid apparatus for an automotive vehicle, which comprises speed generators mounted on the wheels of the automotive vehicle for detecting the speeds of the respective wheels and means for controlling a braking force by the output voltages of said speed generators.

It is another object of the present invention to provide an antiskid apparatus for an automotive vehicle, which comprises at least one speed generator provided on the front wheels and the rear wheels of the automotive vehicle respectively, said speed generators each being provided with a logic circuit, and means for controlling the braking force in response to the output voltage of that one of the speed generators which is mounted on the front wheel or rear wheel which is closest to the locked state.

According to the present invention, it is possible to avoid a loss of steerability of the steering wheel, during the braking operation, due to an unbalance in the braking forces applied to the front and rear wheels and thereby to brake the automotive vehicle in a stable manner.

Furthermore, by providing the speed generators on all wheels of the automotive vehicle to detect the speeds of the respective wheels according to the present invention, there can be brought about the remarkable advantage that the automotive vehicle can be braked in a stable manner without allowing the vehicle body to make a gyrating movement, even when there is an unbalance between the braking forces distributed to the left and right wheels and the coefficients of friction with the surface of a road on which the automotive vehicle runs vary between the left and right wheels.

DESCRIPTION OF THE PREFERRED EMBODIMENTS

The present invention will be described in detail hereinafter with reference to the accompanying drawings.

Figure 1:
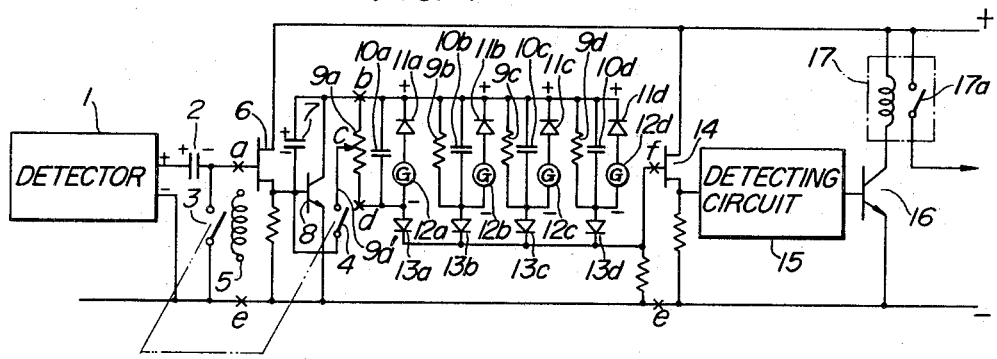
FIG. 1 is an electric circuit diagram of an embodiment of the antiskid apparatus for an automotive vehicle according to the present invention.

In FIG. 1, reference numeral 1 designates a vehicle body deceleration detector of any conventional type mounted on the body of an automotive vehicle and consisting, for example, of a differential transformer of the type wherein a ferrite rod is displaced by means of a weight. Reference numeral 2 designates a condenser, and 3 and 4 designate relay contacts which are opened by a relay coil 5 controlled by a brake pedal. Namely, the relay coil 5 is energized to open the relay contacts 3 and 4 upon actuation of the brake pedal, and deenergized when the foot pressure is removed from the brake pedal, whereby the relay contacts 3 and 4 are closed. Reference numeral 6 designates a transistor which consists, for example, of a field-effect transistor and serves as an impedance converter by raising the input impedance and lowering the output impedance. The input impedance of the transistor 6 is raised for the purpose of preventing the charge stored in the condenser 2 from varying during the braking operation. A condenser 7 stores a voltage proportional to the speed of a wheel which is equal to the speed of the vehicle body immediately before actuation of the braking system, and simultaneously forms a portion of an integration circuit. A transistor 8 forms the integration circuit together with the condenser 7 whereby the voltage representing the vehicle body speed, immediately before braking, stored in the condenser 7 is modified by a value **gdt obtained by integrating the deceleration g of the vehicle body caused by the braking operation with time t. A variable resistor 9a forms together with a condenser 10a a smoothing circuit for the direct-current output of a speed generator 12a, which has been rectified by a diode 11a. The speed generator 12a is mounted on one of the four wheels of the automotive vehicle for detecting the speed of a wheel. Similarly, the other three wheels are also provided with wheel speed detecting circuits respectively each of which consists of a resistor 9b, 9c or 9d, a condenser 10b, 10c or 10d, a diode 11b, 11c or 11d and a speed generator 12b, 12c or 12d.

The aforesaid relay contact 4 serves to establish or break the connection between the sliding contact 9a' of the variable resistor 9a and the condenser 7. Four diodes 13a, 13b, 13c and 13d form an OR logical circuit by which the output voltages of the speed generators 12a, 12b, 12c and 12d are discriminated. A transistor 14 acts as an impedance converter by raising an input impedance. Reference numeral 15 designates a constant-voltage level detecting circuit and consists, for example of a Schmitt circuit, and 16 designates a transistor to actuate a relay 17. The relay 17 operates a hydraulic pressure regulator of the braking system and the arrangement is made such that the braking hydraulic pressure is lowered to reduce the braking force when the relay contact 17a is, for instance, in a closed position and is raised to increase the braking force when said relay contact 17a is in open position.

The antiskid apparatus having a construction as described above operates in the following manner. First of all, when the brake pedal is not actuated, the relay contacts 3 and 4 are closed, so that the condenser 2 is charged with the output voltage of the vehicle deceleration detector 1 through the commutator. On the other hand, a voltage $$\frac{\overline{bc}}{\overline{bd}} V_o = \beta V_o,$$

wherein $V_o$ is a voltage representative of the wheel speed immediately before the actuation of the braking system which is obtained from the speed generator 12a mounted on any one of the four wheels, that is, a voltage which is $\beta$ times a voltage $V_B$ representative of the vehicle body speed, is stored in the condenser 7. Namely, immediately before the actuation of the braking system, the voltage representative of the wheel speed is equal to the voltage $V_B$ representative of the vehicle body speed, so that said voltage $V_B$ obviously becomes the same as the voltage $V_o$ representative of the wheel speed immediately before the actuation of the braking system and thus the voltage which is $\beta$ times the voltage $V_B$ representative of the vehicle body speed is stored by the condenser 7. In the equation indicated above, $bc$ and $bd$ respectively represent the resistances across $b$ and $c$ and across $b$ and $d$ shown in the electric circuit diagram of FIG. 1, and $\beta$ is of course greater than 0 but smaller than 1. Next, when the brake pedal is actuated to apply a braking force while the automotive vehicle is running, the relay contacts 3 and 4 are opened and as a result the condenser 2 is connected in series with the vehicle deceleration detector 1 with the charge on condenser 2 being of a polarity as to oppose the output potential of detector 1. Therefore, the voltage across the input terminals $a$ and $e$ of the transistor 6 becomes without fail zero at the instant when the brake pedal is actuated. The condenser 2 is provided for this purpose in order to prevent the influence of gravity, just before the actuation of the brake pedal, from being exerted upon the deceleration of the vehicle body. As the vehicle body is decelerated, a current corresponding to the magnitude of the deceleration detected by the vehicle body deceleration detector flows across the base and emitter of the transistor 8 through the transistor 6, and the charge stored in the condenser 7 immediately before the actuation of the braking system is discharged through the collector and emitter of the transistor 8. Consequently, the voltage $V_c$ which is $\beta$ times the voltage $V_B$ representative of the actual vehicle speed, appears across the condenser 7.

Figure 2A:
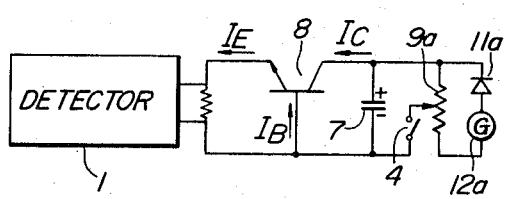
FIG. 2a is a simplified electric circuit diagram of a principal portion of FIG. 1.
Figure 2B:
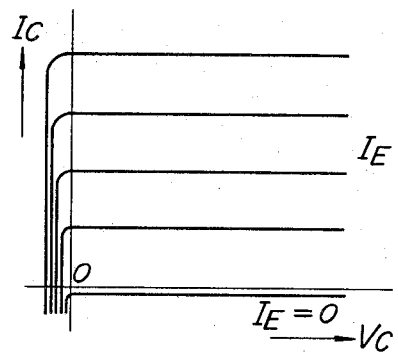
FIG. 2b is a chart illustrating the electrical characteristic on the output side of a transistor shown in FIG. 2a when the base thereof is grounded.

The reason for this will be described in more detail with reference to FIGS. 2a and 2b. As shown in FIG. 2a, which is a schematic illustration of the mode of connection of transistor 8 to the remainder of the circuit, the transistor 8 is connected in a common base configuration with respect to condenser 7 and the output resistor of transistor 6. Therefore, the output current $I_c$ is controlled proportionally only by the input current $I_E$, independently of the output voltage $V_c$ as seen from the output characteristic shown in FIG. 2. From the relation $Q = CV_c$, wherein C is electrostatic capacity, an equation $$\frac{dQ}{dt} = c\frac{dVc}{dt}$$

is is obtained and a relation of output current $$Ic = -c\frac{dVc}{dt}$$

is is established. Further, since there is a relation expressed by the equation $Ic = aI_E$ wherein $a$ is current transportation, etc. of the transistor. Therefore, integration of the above equation will result in an equation $$Vc = -\frac{a}{c}\int I_E dt$$

Further, the voltage stored in the condenser 7 is $\beta V_o$, so that when considering the initial conditions the voltage across the condenser 7 becomes $$V_o V_b = \beta V_o - \frac{a}{c}\int I_E dt$$

Namely, the voltage Vc which is $\beta$ times the voltage $V_B$ representative of the vehicle speed is obtained. On the other hand, when the relay contact 4 is opened upon the actuation of the brake pedal, the voltages across the condenser 7 and the group of the speed generators 12a, 12b, 12c and 12d for detecting the wheel speeds are algebraically added together in series but in opposite polarities, hence the highest positive one among the following four values of Vef's $$Vef = Veg + Vc - (V_{G1} \text{ or } V_{G2} \text{ or } V_{G3} \text{ or } V_{G4})$$

is first impressed across the input terminal $ef$ $e$ and $f$ the transistor 14 through a logic circuit composed of the diodes 13a, 13b, 13c and 13d. Where $V_{G1}$ to $V_{G4}$ represent the output voltages of the speed generators representative of the speeds of the four wheels respectively, and the expression $V_{G1} = V_{G2} = V_{G3} = V_{G4} = V_o = V_B$ holds immediately before the actuation of the braking system.

Veg is the voltage across the emitter and the base of the transistor 8 and is usually negligibly small. Consequently, the input voltage Vef which is the highest positive one among the following four values of Vef's $$Vef = Vc - (V_{G1} \text{ or } V_{G2} \text{ or } V_{G3} \text{ or } V_{G4})$$

is first impressed across the input terminal $ef$ $e$ and $f$ the transistor 14. Therefore, if the constant-voltage level detecting circuit 15 is designed such that the contact 17a of the relay 17 is closed when the value of Vef is positive and opened when said value is zero, the relay contact 17a is closed and the braking hydraulic pressure drops when the voltage Vc across the terminals of the condenser 7 becomes higher than any one of the output voltages $V_{G1}$, $V_{G2}$, $V_{G3}$ and $V_{G4}$, while it is opened and the braking hydraulic pressure increases when the voltage Vc becomes lower than every one of the output voltages $V_{G1}$, $V_{G2}$, $V_{G3}$ and $V_{G4}$ of the speed generators. Since the voltage Vc developed across the terminals of the condenser 7 is $\beta$ times the voltage $V_B$ representative of the vehicle speed, the relay 17 operates in such a manner that the contact 17a thereof is closed when the voltage $\beta V_B$ becomes higher than any one of the output voltages $V_{G1}$, $V_{G2}$, $V_{G3}$ and $V_{G4}$ of the speed generators, and opened when said voltage $\beta V_B$ becomes lower than every one of the output voltages $V_{G1}$, $V_{G2}$, $V_{G3}$ and $V_{G4}$ of the speed generators. In other words, when any one of the voltages $V_{G1}$, $V_{G2}$, $V_{G3}$ and $V_{G4}$, representative of the speeds of the four wheels, becomes lower than $\beta V_B = Vc$, the relay contact 17a is closed and accordingly the braking hydraulic pressure drops. On the other hand, the wheel slip ratio $\sigma$ is determined by the vehicle body speed $S_B$ and the wheel speed $S_H$, i.e.

$$\sigma = \frac{S_B - S_H}{S_B}$$

and from this, the expressions $$S_B(1-\sigma) = S_H$$

, hence, $\beta = 1 - \sigma$ can be obtained. Thus, it is possible to express $\beta$ in terms of the wheel slip ratio $\sigma$.

In describing the above-described operation in other words, it can be said that when the slip ratio of any one of the four wheels becomes greater than the set slip ratio $\sigma_o$ during the braking operation, that is, when any one of the four wheels is about to be locked, the braking hydraulic pressure drops permitting the wheel to rotate, whereas, when the slip ratios of all of the four wheels become smaller than the set slip ratio $\sigma_o$, the braking hydraulic pressure rises. As will be understood from the foregoing, to control the braking force by detecting the wheel slip ratio $\sigma$ is extremely advantageous in shortening the braking distance by making use of the fact that the deceleration of the vehicle body becomes largest when the wheel slip ratio $\sigma$ is in the range of 15——20 percent. Therefore, $\beta$ is chosen to have a value approximately $\beta = 1 - \sigma + 1 - 0.2 = 08$.

Figure 3:
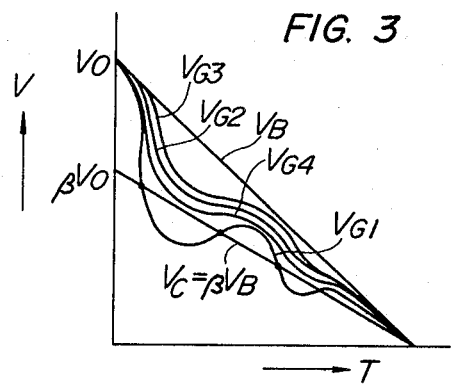
FIG. 3 is a chart for the purpose of explaining the operation of the apparatus of this invention.

Next, the above-described operation will be explained with reference to FIG. 3. Referring to the diagram shown in FIG. 3, the axis of the ordinate is scaled by speed voltage V and the axis of the abscissa by braking time T. A curve $V_B$ represents the voltage $V_B$ representative of the vehicle speed, which cannot be actually referred to in the electric circuit shown in FIG. 1, only $V_o$ being equal to each of the output voltages $V_{G1}$, $V_{G2}$, $V_{G3}$ and $V_{G4}$ of the speed generators at T=0. A curve $V_C$ represents a voltage $\beta$ times the voltage $V_B$, which is developed across the terminals of the condenser 7. Curves $V_{G1}$, $V_{G2}$, $V_{G3}$ and $V_{G4}$ respectively represent the output voltages of the speed generators which are representative of the speeds of the four wheels when the braking hydraulic pressure is controlled. When any one of the voltages $V_{G1}$, $V_{G2}$, $V_{G3}$ and $V_{G4}$ of the speed generators representative of the speeds of the four wheels becomes lower than a voltage $\beta$ times the voltage $V_B$ representative of the vehicle speed, after the braking hydraulic pressure is increased, the relay contact 17a is closed, with the result that the braking hydraulic pressure drops. Conversely, when all of the voltages $V_{G1}$, $V_{G2}$, $V_{G3}$ and $V_{G4}$, representative of the speeds of the four wheels, become higher than a voltage which is $\beta$ times the voltage $V_B$ representative of the vehicle speed, the relay contact 17a is opened, with the result that the braking hydraulic pressure increases. As is apparent from FIG. 3, this is the case wherein the braking force is working most effectively on that one of the four wheels the speed of which is represented by the voltage $V_{G1}$, and the braking hydraulic pressure is controlled by the voltage $V_{G1}$, the other three wheels being rotating at a higher rate than the wheel whose speed is represented by the voltage $V_{G1}$. In other words, the braking hydraulic pressure is controlled by the output voltage of the speed generator which is mounted on that one of the wheels which will be locked first and none of the four wheels will be locked before the vehicle is braked. Therefore, the body of the automotive vehicle can be braked in a stable manner as a whole, even when there is an unbalance between the braking forces applied to the left and right wheels or when the automotive vehicle is running on an asphalt road surface on one side and a frozen road surface on the other side, whereby the coefficients of friction of the left and the right wheels differ largely from each other.

Although in the embodiment described hereinabove the braking force is controlled by detecting the speeds of all of the four wheels, the system may be simplified so as to detect the speeds of the front wheels and the rear wheels in two groups and even with such a simplified system, it is possible to reliably avoid locking of the wheels due to an unbalance between the braking forces applied to the front wheels and the rear wheels respectively, which will result from an abrupt braking operation, and thereby to enhance the operational safety of the automotive vehicle remarkably.

We claim:

1. Apparatus for use in conjunction with a brake pedal the movement of which selectively generates a signal and for controlling vehicle braking operation to prevent skidding, comprising.

wheel speed detecting means for detecting the respective speeds of four wheels of said vehicle;

detecting means for detecting vehicle body deceleration;

switch means coupled to said brake pedal, and elimination circuit means for acceleration of gravity composed of a first condenser, a second condenser and an integrating circuit operable therewith for detecting the vehicle body speed during a braking operation wherein the wheel speed immediately before the braking operation is stored as an initial vehicle body speed in said second condenser and the charge stored in said second condenser is discharged in response to the amount of the vehicle body deceleration detected by said detecting means during a braking operation, said detected vehicle body speed being compared with each of said detected wheel speeds so that a braking force may be released when any one of said detected wheel speeds becomes lower than a predetermined percent (for example, 80 percent) of said detected vehicle body speed during a braking operation.

2. The apparatus defined in claim 1 wherein at least one of said wheel speed detecting means is disposed at each of axially-related pairs of wheels.